United States Patent
Palmore et al.

(10) Patent No.: US 9,112,192 B2
(45) Date of Patent: Aug. 18, 2015

(54) REACTANT DELIVERY TO A REACTIVE SURFACE IN A CHANNEL

(75) Inventors: Tayhas Palmore, Providence, RI (US); Keng Guan Lim, Singapore (SG)

(73) Assignee: Brown University, Providence, RI (US)

( * ) Notice: Subject to any disclaimer, the term of this patent is extended or adjusted under 35 U.S.C. 154(b) by 853 days.

(21) Appl. No.: 12/718,444

(22) Filed: Mar. 5, 2010

(65) Prior Publication Data

US 2010/0323262 A1 Dec. 23, 2010

Related U.S. Application Data

(60) Provisional application No. 61/158,136, filed on Mar. 6, 2009.

(51) Int. Cl.
H01M 8/04 (2006.01)
H01M 8/02 (2006.01)
H01M 8/10 (2006.01)

(52) U.S. Cl.
CPC .......... *H01M 8/0247* (2013.01); *H01M 8/0265* (2013.01); *H01M 8/1009* (2013.01); *H01M 8/1011* (2013.01); *H01M 8/0258* (2013.01); *H01M 2008/1095* (2013.01); *Y02E 60/523* (2013.01)

(58) Field of Classification Search
CPC .......................... H01M 8/0258; H01M 8/0265
USPC ........................................................ 429/443
See application file for complete search history.

(56) References Cited

U.S. PATENT DOCUMENTS

| 5,434,020 | A | 7/1995 | Cooper |
| 6,361,892 | B1 * | 3/2002 | Ruhl et al. .................... 429/443 |
| 6,551,736 | B1 | 4/2003 | Barbir et al. |
| 6,586,128 | B1 | 7/2003 | Johnson et al. |

(Continued)

FOREIGN PATENT DOCUMENTS

| EP | 0 033 416 A1 | 8/1981 |
| WO | WO 2006/072165 A1 | 7/2006 |

OTHER PUBLICATIONS

Anderson et al., "Numerical simulation of convective diffusion at a rectangular channel flow electrode," *J Electroanal Chem* 179(1-2):107-117 (1984).

(Continued)

*Primary Examiner* — Jane Rhee
(74) *Attorney, Agent, or Firm* — Wolf, Greenfield & Sacks, P.C.

(57) ABSTRACT

The present invention provides geometric arrangements for channels through which liquids or other fluids can be made to flow, for enhanced performance of fuel cells or other chemical or biochemical reactors or analyzers. Systems and methods including these improved geometries are described herein for enhanced performance of a variety of devices. Specifically, in one set of embodiments, the reactors comprise one or more microchannels comprising a tapered cross-sectional area and at least one reactive surface portion. By flowing a liquid comprising one or more reactants through the channel such that the cross-sectional area decreases in a downstream direction, relatively more reactant may be supplied to the wall at downstream positions relative to the amount that would be supplied in a system without a tapered cross-section. In some embodiments, the microchannel may be constructed and arranged such that the amount of reactant supplied to the wall conforms to a predetermined distribution.

18 Claims, 7 Drawing Sheets

(56) References Cited

U.S. PATENT DOCUMENTS

| | | | |
|---|---|---|---|
| 6,638,654 B2 * | 10/2003 | Jankowksi et al. | ............ 429/434 |
| 2004/0023100 A1 | 2/2004 | Boff et al. | |
| 2007/0287034 A1 * | 12/2007 | Minteer et al. | .................... 429/2 |

OTHER PUBLICATIONS

Argyropoulos et al., "Gas evolution and power performance in direct methanol fuel cells," *J Appl Electrochem* 29:661-669 (1999).

Bazylak et al., "Improved fuel utilization in microfluidic fuel cells: A computational study," *J Power Sources* 143:57-66 (2005).

Choban et al., "Membraneless laminar flow-based micro fuel cells operating in alkaline, acidic, and acidic/alkaline media," *Electrochimica Acta* 50:5390-5398 (2005).

Choban et al., "Microfluidic fuel cell based on laminar flow," *J Power Sources* 128:54-60 (2004).

Cohen et al., "Fabrication and preliminary testing of a planar membraneless microchannel fuel cell," *J Power Sources* 139:96-105 (2005).

Cooper et al., "Channel Electrodes—A Review," *Electroanalysis* 10(3):141-155 (1998).

Ferrigno et al., "Membraneless Vanadium Redox Fuel Cell Using Laminar Flow," *J Am Chem Soc* 124:12930-12931 (2002).

Harrison et al., "A rapid prototyping technique for the fabrication of solvent-resistant structures," *J Micromech Microeng* 14:153-158 (2004).

Ismagilov et al., "Experimental and theoretical scaling laws for transverse diffusive broadening in two-phase laminar flows in microchannels," *Appl Phys Letters* 76(17):2376-2378 (2000).

Jayashree et al., "Air-Breathing Laminar Flow-Based Microfluidic Fuel Cell," *J Am Chem Soc* 127:16758-16759 (2005).

Lim et al., "Microfluidic biofuel cells: the influence of electrode diffusion layer on performance," *Biosens Bioelectron* 22(6):941-947 (2007).

Mitrovski et al., "Microfluidic Devices for Energy Conversion: Planar Integration and Performance of a Passive, Fully Immersed $H_2$—$O_2$ Fuel Cell," *Langmuir* 20:6974-6976 (2004).

Nicolas et al., "Fabrication of a gray-tone mask and pattern transfer in thick photoresists," *J Micromech Microeng* 8:95-98 (1998).

Unwin et al., "The use of channel electrodes in the investigation of interfacial reaction mechanisms," Chapter 6, *Comprehensive Chemical Kinetics, 29*, R.G. Compton and A. Hamnett, eds., Elsevier Science Publishers BV, Amsterdam, The Netherlands and Elsevier Science Publ. Co., Inc., New York, New York, 1989, pp. 173-296.

Willner et al., "Biofuel cell based on glucose oxidase and microperoxidase-11 monolayer-functionalized electrodes," *J Chem Soc, Perkins Trans* 2:1817-1822 (1998).

* cited by examiner

REACTANT DELIVERY TO A REACTIVE SURFACE IN A CHANNEL

RELATED APPLICATIONS

This application claims the benefit of U.S. Provisional Patent Application Ser. No. 61/158,136, filed on Mar. 6, 2009, entitled "Reactant Delivery to a Reactive Surface in a Channel," by Palmore et al., which is incorporated herein by reference in its entirety for all purposes.

FIELD OF INVENTION

The present invention relates to the delivery of reactant to a reactive surface in a channel. In some cases, the microchannel geometry may be optimized for improved performance.

BACKGROUND

Laminar flow of fluids within microchannels has been studied for use in microfluidic fuel cells, which consist of an anode and cathode configured as a galvanic cell within a microchannel Parallel streams of fuel and oxidant flow across the anode and cathode, respectively, where electrochemical reactions occur when the potential difference between fuel and oxidant is thermodynamically favorable.

In many conventional reactive microfluidic channels (e.g., fuel cells), the rate of reaction declines along the length of the microfluidic channel. In fuel cells, this may lead to declines in current and power density. These effects may be explained in terms of the diffusion layer. The diffusion layer is the thin layer of liquid near the electrode surface where rapid changes in the concentration of oxidized or reduced species occurs during an electrochemical reaction. Under conditions of convective flow and high Peclet number, the diffusion layer is confined near the surface of the electrode analogous to Prandtl's boundary layer. As the electrochemical reaction proceeds, electroactive species are depleted cumulatively. As such, the leading edge of the electrode experiences a higher concentration of electroactive species relative to the trailing edge because the thickness of the diffusion layer is increasing along the length of the electrode. As the thickness of the diffusion layer increases, the average mass flux toward the electrode decreases along with the corresponding current and power density.

Accordingly, improved compositions and methods are needed.

SUMMARY OF THE INVENTION

The present invention relates generally to compositions and methods for the reaction of components in channels. The subject matter of the present invention involves, in some cases, interrelated products, alternative solutions to a particular problem, and/or a plurality of different uses of one or more systems and/or articles.

In one set of embodiments, a method is described. The method comprises, in some embodiments, providing an enclosed microchannel. In some instances, the microchannel comprises a first microchannel segment with a first cross-sectional area, and a second microchannel segment with a second cross-sectional area that is smaller than the first cross-sectional area. The microchannel may also comprise, in some embodiments, a surface comprising a reactive surface portion. In some embodiments, the method also comprises flowing a liquid through the microchannel from the first segment to the second segment, wherein the liquid comprises at least one reactant capable of chemically or biologically reacting at the reactive surface portion of the microchannel.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
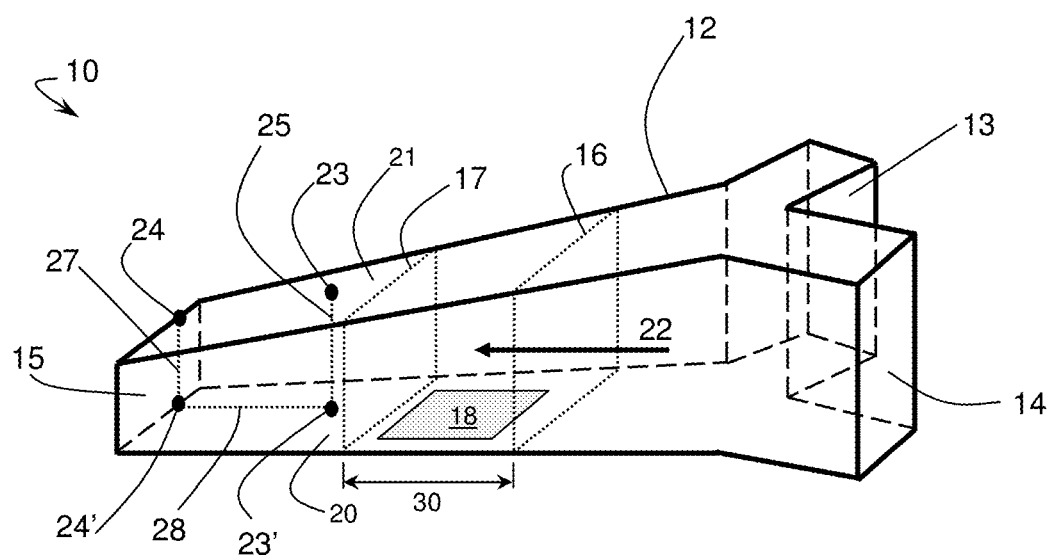
FIGS. 1A-1B are schematic illustrations of a microfluidic device, according to one set of embodiments.

The present invention provides geometric arrangements for channels through which liquids or other fluids can be made to flow, for enhanced performance of fuel cells or other chemical or biochemical reactors or analyzers. Systems and methods including these improved geometries are described herein for enhanced performance of a variety of devices. From the following description, it will be appreciated that the geometries of the invention can be applied to a wide variety of existing devices so as to achieve improvement. Specifically, in one set of embodiments, the reactors comprise one or more channels comprising a tapered cross-sectional area and at least one reactive surface portion. By flowing a liquid comprising one or more reactants through the channel such that the cross-sectional area decreases in a downstream direction, relatively more reactant may be supplied to the reactive surface portion at downstream positions relative to the amount that would be supplied in a system without a tapered cross-section. In some embodiments, the microchannel may be constructed and arranged such that the amount of reactant supplied to the reactive surface portion conforms to a predetermined distribution.

In microchannel reactors comprising substantially constant cross-sectional areas, the concentration of reactant in the fluid stream decreases in the direction of flow as the reaction progresses. The decrease in reactant concentration may lead to, for example, a decrease in the reaction rate along the length of the channel, which may be undesirable in some instances. The inventors have discovered, within the context of the invention, that by fabricating microfluidic channels such that the cross-sectional area decreases in the direction of fluid flow, the amount of reactant supplied to a reactive surface portion may remain substantially constant, producing a substantially constant rate of reaction along the reactive surface portion.

The systems and methods described herein may find application in any system in which it is desirable to control the amount of a reactant supplied to a reactive surface portion. For example, tapered channels may be used in microfluidic fuel cells (e.g., methanol fuel cells) to control the reaction rate at one or more electrodes. In some cases, the systems and methods can be used in biological microreactors. For example, tapered channels may be used to control the amount of a biological molecule (e.g., a protein) supplied to a wall on which a binding partner is immobilized.

It should be noted that the systems and methods described herein may be used for designing improved reaction profiles within any suitable system utilizing channels with at least one reactive surface portion, and are not limited to the specific channel configurations described herein. Additional advantages of devices including tapered channels constructed to achieve predetermined reactant distributions are described in more detail below.

Examples of fluidic devices and methods associated therewith are now provided.

FIG. 1A shows a schematic illustration of a fluidic device 10 which includes a channel 12. The channel may be part of, for example, a fuel cell, a chemical or biological reactor, a chemical or biological sensor, or other suitable device. In the set of embodiments illustrated in FIG. 1, the channel comprises two inlets, 13 and 14, and one outlet 15. In other embodiments, the channel may comprise any number of inlets and/or outlets. In addition, channel 12 comprises a first segment 16 with a first cross-sectional area and a second segment 17 with a second cross-sectional area that is smaller than the first cross-sectional area. "Channel" is used herein to refer to a feature on or in an article or substrate (e.g., formed in a surface/side of an article or substrate) that at least partially directs the flow of a fluid. A "channel segment," as used herein, refers to a portion of a fluidic channel that spans an entire cross-section of the channel and is substantially perpendicular to fluid flow. The "cross-sectional area" of a channel, channel segment, etc. is measured perpendicular to the direction of fluid flow and may be averaged over the length of a channel or channel segment (e.g., a dimension substantially parallel to fluid flow) to provide an "average cross-sectional area."

The channel in FIG. 1A has a rectangular cross-section. In other embodiments, the channel may have any suitable cross-sectional shape including, for example, a square, a triangle, a circle, an ellipse, a hexagon, an irregular shape, or any other shape. In the set of embodiments illustrated in FIG. 1A, both the height and the width of the channel decrease along the direction of arrow 22. In some embodiments, the height of the channel may decrease along the direction of fluid flow while the width remains substantially constant.

In some embodiments, the distance between two opposing surfaces (e.g., a surface comprising a reactive surface portion and an opposing surface) may be larger at a first point on a first surface than at a second point directly downstream of the first point on the first surface. As used herein, two surfaces are "opposing" when they are generally facing each other. Opposing surfaces need not necessarily be parallel to each other. In addition, a point is "directly downstream" of another when both points lie on a line substantially parallel to the average direction of fluid flow (e.g., arrow 22 in FIG. 1).

For example, in FIG. 1A, surface 21 comprises point 23, while surface 20 comprises point 23'. Points 23 and 23' are separated by a distance indicated by line 25, which is measured normal to surface 20. In addition, surface 21 comprises point 24, and surface 20 comprises point 24'. Points 24 and 24' are directly downstream of points 23 and 23', respectively, a distance indicated by line 28. Points 24 and 24' are separated by a distance indicated by line 27, which is also measured normal to surface 20. The distance between points 24 and 24' is smaller than the distance between 23 and 23'. Channels described herein may include any suitable ratio of distances between two opposing surfaces (e.g., a surface comprising a reactive surface portion and an opposing surface) measured at any two points. For example, the ratio of the distances between two opposing surfaces measured at a first point on one of the two opposing surfaces and a second point on the same surface may be at least about 1.5:1, at least about 2:1, at least about 5:1, at least about 7:1, at least about 10:1, or greater. In some embodiments, the first point may be located at an inlet of the channel, and the second point may be located at an outlet of the channel. In some cases, the second point may be located directly downstream of the first point, as illustrated in FIG. 1A.

In addition, the distance between opposing surfaces measured at a first point and a second point directly downstream of the first point may decrease at any suitable rate. For example, in FIG. 1A, the distance between surfaces 21 and 20 (measured at points 23' and 24') decreases at a rate of about 1 unit for every 6 units substantially parallel to fluid flow (e.g., along line 28). That is to say, line 28 is roughly 6 times longer than the difference in the lengths of lines 25 and 27. In some embodiments, the distance between two opposing surfaces (e.g., a surface comprising a reactive surface portion and its opposing surface) may decrease at least about 1 unit for every 500 units in length along the channel in the direction of fluid flow (i.e., at a rate of at least about 1:500). In some embodiments, the distance between two opposing surfaces may decrease at a rate of at least about 1:250, at least about 1:100, at least about 1:50, at least about 1:25, at least about 1:10, at least about 1:5, at least about 1:2, or faster. While the channel shown in FIG. 1A includes a linear decrease in the distance between opposing surfaces 20 and 21, other embodiments may include a channel with a non-linear decrease in the distance between opposing surfaces. For example, in some embodiments, surface 21 may be curved.

In some embodiments, the cross-sectional area of a channel may decrease at any suitable rate. For example, in FIG. 1A, the cross-sectional area of channel 12 decreases by about 30% (as measured by comparing the areas of segments 16 and 17) over a distance indicated by arrow 30. In some embodiments, the cross-sectional area of a channel may decrease by at least about 5%, at least about 10%, at least about 15%, at least about 25%, at least about 40%, at least about 50%, at least about 70%, at least about 90%, or more over a length substantially parallel to the average direction of fluid flow of less than about 100 mm, less than about 50 mm, less than about 25 mm, less than about 10 mm, less than about 5 mm, less than about 2 mm, less than about 1 mm, or less. The fluidic device in FIG. 1A comprises a reactive surface portion 18. As shown in FIG. 1A, the reactive surface portion comprises a fraction of surface 20. In other embodiments, the reactive surface portion may span an entire surface of the channel. Furthermore, in some embodiments, the channel may comprise more than one reactive surface portion on a single channel surface, multiple channel surfaces, or both.

The reactive surface portion may comprise, in some embodiments, a catalyst and/or a reactant. In some instances, the surface itself may be fashioned from a material that acts as a catalyst or a reactant in a chemical reaction. In some cases, a catalyst or reactant may be immobilized on the reactive surface. In some embodiments, the reactive surface comprises an entity capable of binding with one or more entities in the fluid stream in the channel (i.e., a binding partner). For example, the binding partner may be immobilized on one or more reactive surfaces. In some embodiments, the reactive surface portion may comprise an electrode. For example, the reactive surface portion may comprise an electrode that is used as part of a fuel cell.

In one set of embodiments, one or more fluids (e.g., liquids) may be flowed through the channel in the direction of arrow 22 (e.g., in a direction from the first channel segment 16 to the second channel segment 17). As used herein, the term "fluid" generally refers to a substance that tends to flow and to conform to the outline of its container. Typically, fluids are materials that are unable to withstand a static shear stress, and when a shear stress is applied, the fluid experiences a continuing and permanent distortion. For example, in some cases a fluid may comprise a liquid, a gas, a colloid, etc. Examples of fluids that may be used include, but are not limited to, water, alcohols (e.g., methanol), liquid or gaseous hydrocarbons (e.g., propane, butane, octane, etc.), and aqueous solutions of the same, among others. While, in most embodiments described herein, the invention is described as flowing a liquid through a microchannel, it is to be understood that any fluid as defined herein could be used. For purposes of brevity, not every embodiment is described in terms of all such fluids but it is to be understood that in each instance any fluid, or a liquid as described, can be used.

The fluid in channel 12 may comprise at least one reactant (e.g., one, two, three, or more reactants) capable of chemically or biologically reacting when contacted with a reactive surface portion of the channel. Suitable reactants include, for example, fuels and oxidants. For example, in some cases, alcohols (e.g., methanol), hydrocarbons (e.g., methane, propane, butane, octane, etc), or any other suitable fuel may be used as a reactant. As used herein, an "oxidant" is given its normal meaning in the art, and is used to refer to any substance that gains electrons in a redox chemical reaction (e.g., combustion). Examples of oxidants include, for example, oxygen, air, peroxide compounds (e.g., hydrogen peroxide), etc.

A variety of chemical or biological reactions may be employed in the systems and methods described herein. In some embodiments, the chemical reaction may comprise an electrochemical reaction (e.g., a half reaction in a fuel cell). In some cases, a biological reaction may comprise an affinity reaction between proteins or other biomolecules (e.g., DNA, RNA, carbohydrates, etc.), or non-naturally occurring molecules. In some cases, one reactant may decompose into two or more products, and in some cases, at least one product may be formed upon reacting two or more reactants. A catalyst may be involved in any of the processes outlined above. For example, chemically reacting may comprise forming one or more products from a first reactant and a second reactant using a catalyst.

In some embodiments, a chemical or biological reaction involves binding. The term "binding" refers to the interaction between a corresponding pair of molecules that exhibit mutual affinity or binding capacity, typically specific or non-specific binding or interaction, including biochemical, physiological, and/or pharmaceutical interactions. Biological binding defines a type of interaction that occurs between pairs of molecules including proteins, nucleic acids, glycoproteins, carbohydrates, hormones and the like. Specific examples include antibody/antigen, antibody/hapten, enzyme/substrate, enzyme/inhibitor, enzyme/cofactor, binding protein/substrate, carrier protein/substrate, lectin/carbohydrate, receptor/hormone, receptor/effector, complementary strands of nucleic acid, protein/nucleic acid repressor/inducer, ligand/cell surface receptor, virus/ligand, etc. Binding may also occur between proteins or other components and cells. In addition, devices described herein may be used for other fluid analyses (which may or may not involve binding and/or reactions) such as detection of components, concentration, etc.

Channels and/or channel segments described herein can be covered or uncovered. In embodiments where a channel or channel segment is completely covered, at least one portion of the channel or channel segment can have a cross-section that is completely enclosed, or the entire channel or channel segment may be completely enclosed along its entire length with the exception of its inlet(s) and/or outlet(s). Channels and channel segments may have any suitable aspect ratio (length to average cross-sectional dimension). For example, in some embodiments, a channel or channel segment may have an aspect ratio of at least 2:1, more typically at least 3:1, 5:1, or 10:1 or more. In some embodiments, one or more channels or channel segments are microfluidic. "Microfluidic," as used herein, refers to a device, apparatus or system including at least one fluid channel having a cross-sectional dimension of less than 1 mm, and a ratio of length to largest cross-sectional dimension of at least 3:1. A "microfluidic channel," "microchannel," or "microfluidic channel segment" as used herein, is a channel or channel segment meeting these criteria. Though in some embodiments, devices of the invention may be microfluidic, in certain embodiments, the invention is not limited to microfluidic systems and may relate to other types of fluidic systems. Furthermore, it should be understood that all or a majority of the channels described herein may be microfluidic in certain embodiments. The "cross-sectional dimension" (e.g., a diameter, a height, and/or a width) of a channel or channel segment is measured perpendicular to the direction of fluid flow.

In one set of embodiments, the maximum cross-sectional dimension of one or more channels or channel segments containing embodiments described herein is less than about 750 microns, less than about 500 microns, less than about 300 microns, less than about 200 microns, less than about 100 microns, less than about 50 microns, less than about 25 microns, less than about 10 microns, or less than about 5 microns. In some cases, at least two cross-sectional dimensions (e.g., a height and a width) of a channel, channel segment, or channel portion have one or more of the dimensions listed above (e.g., a width of less than 500 microns and a height of less than 200 microns).

One or more channels or channel segments described herein may have any suitable length. In some cases, the channels or channel segments may be at least about 1 mm long, at least about 2 mm long, at least about 5 mm long, at least about 10 mm long, at least about 20 mm long, at least about 50 mm long, or longer.

A variety of materials and methods, according to certain aspects of the invention, can be used to form systems described herein. In some cases, the various materials selected lend themselves to various methods. For example, various components of the invention can be formed from solid materials, in which channels can be formed via micromachining, film deposition processes such as spin coating and chemical vapor deposition, laser fabrication, photolithographic techniques, etching methods including wet chemical or plasma processes, and the like. See, for example, *Scientific American*, 248:44-55, 1983 (Angell, et al). In one embodiment, at least a portion of the fluidic system is formed of silicon by etching features in a silicon chip. Technologies for precise and efficient fabrication of various fluidic systems and devices of the invention from silicon are known. In another embodiment, various components of the systems and devices of the invention can be formed of a polymer, for example, an elastomeric polymer such as polydimethylsiloxane ("PDMS"), polytetrafluoroethylene ("PTFE" or Teflon®), or the like.

Different components can be fabricated of different materials. For example, a base portion including a bottom wall and side walls can be fabricated from an opaque material such as silicon, and a top portion can be fabricated from a transparent or at least partially transparent material, such as glass or a transparent and/or partially transparent polymer (e.g., PDMS), for observation and/or control of the fluidic process. Components can be coated so as to expose a desired chemical functionality to fluids that contact interior storage channel walls, where the base supporting material does not have a precise, desired functionality. For example, components can be fabricated as illustrated, with interior storage channel walls coated with another material. Material used to fabricate various components of the systems and devices of the invention, e.g., materials used to coat interior walls of fluid storage channels, may desirably be selected from among those materials that will not adversely affect or be affected by fluid flowing through the fluidic system, e.g., material(s) that is chemically inert in the presence of fluids to be used within the device.

In one embodiment, various components of the invention are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and/or transporting fluids contemplated for use in and with the fluidic network. In one embodiment, the hardenable fluid comprises a polymeric liquid or a liquid polymeric precursor (i.e. a "prepolymer"). Suitable polymeric liquids can include, for example, thermoplastic polymers, thermoset polymers, or mixture of such polymers heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, etc.

Silicone polymers are preferred in one set of embodiments, for example, the silicone elastomer polydimethylsiloxane. Non-limiting examples of PDMS polymers include those sold under the trademark Sylgard by Dow Chemical Co., Midland, Mich., and particularly Sylgard 182, Sylgard 184, and Sylgard 186. Silicone polymers including PDMS have several beneficial properties that can simplify fabrication of the microfluidic structures of some embodiments. For instance, such materials are inexpensive, readily available, and can be solidified from a prepolymeric liquid via curing with heat. For example, PDMSs are typically curable by exposure of the prepolymeric liquid to temperatures of about, for example, about 65° C. to about 75° C. for exposure times of, for example, about an hour. Also, silicone polymers, such as PDMS, can be elastomeric, and thus may be useful for forming very small features with relatively high aspect ratios, necessary in certain embodiments of the invention. Flexible (e.g., elastomeric) molds or masters can be advantageous in this regard.

One advantage of forming structures such as microfluidic structures of some embodiments from silicone polymers, such as PDMS, is the ability of such polymers to be oxidized, for example by exposure to an oxygen-containing plasma such as an air plasma, so that the oxidized structures contain, at their surface, chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods which can be useful in the context of the present invention, as well as overall molding techniques, are described in the art, for example, in an article entitled "Rapid Prototyping of Microfluidic Systems and Polydimethylsiloxane," *Anal. Chem.*, 70:474-480, 1998 (Duffy, et al.), incorporated herein by reference.

In some embodiments, certain microfluidic structures of the invention (or interior, fluid-contacting surfaces) may be formed from certain oxidized silicone polymers. Such surfaces may be more hydrophilic than the surface of an elastomeric polymer. Such hydrophilic storage channel surfaces can thus be more easily filled and wetted with aqueous solutions.

In one embodiment, a bottom wall of a microfluidic device of the invention is formed of a material different from one or more side walls or a top wall, or other components. For example, the interior surface of a bottom wall can comprise the surface of a silicon wafer or microchip, a surface comprising electrodes, or other substrate. Other components can, as described above, be sealed to such alternative substrates. Where it is desired to seal a component comprising a silicone polymer (e.g. PDMS) to a substrate (bottom wall) of different material, the substrate may be selected from the group of materials to which oxidized silicone polymer is able to irreversibly seal (e.g., glass, silicon, silicon oxide, quartz, silicon nitride, polyethylene, polystyrene, epoxy polymers, and glassy carbon surfaces which have been oxidized). Alternatively, other sealing techniques can be used, as would be apparent to those of ordinary skill in the art, including, but not limited to, the use of separate adhesives, bonding, solvent bonding, ultrasonic welding, etc.

The following applications are incorporated herein by reference for all purposes: U.S. Provisional Patent Application Ser. No. 61/158,136, filed on Mar. 6, 2009, entitled "Reactant Delivery to a Reactive Surface in a Channel," by Palmore et al.

The following examples are intended to illustrate certain embodiments of the present invention, but do not exemplify the full scope of the invention.

Example 1

In this example, the analytical solution to the convective-diffusion equation, which governs the transport of solute in a moving liquid, is outlined. The analytical solution predicts the diffusion-limited current generated by an electrochemical reaction at an electrode. Levich described the non-uniform distribution of electroactive species along the length of an electrode in terms of the diffusion limited current ($I_{max}$) as $$I_{max} = 1.468 n F w_e C_0 \left( \frac{Q D^2 l_e^2}{W h^2} \right)^{1/3} \quad [1]$$

where n corresponds to the number of electrons, F is the Faraday constant, $w_e$ and $l_e$ are the width and length of the electrode, respectively, $C_o$ is the bulk concentration, Q is the flow rate, D is the diffusion coefficient, and W and h are the width and height of the microchannel, respectively. Thus, current varies as $(l_e)^{2/3}$ under transport limited conditions, indicating that the rate of mass transport of electroactive species to the electrode decreases as the length of the electrode increases. For comparison, both the thickness of the diffusion layer and current are constant across the entire surface of a rotating disk electrode making the electrode uniformly accessible to electroactive species.

In addition to electrode length, the height of the microchannel can affect the performance of a microfluidic fuel cell. The extent of this effect can be predicted by Equation 1. Thus, reducing the height of the microchannel in a microfluidic fuel cell should result in a thinner diffusion layer and an increase in the average mass flux to the surface of the electrode. To test this prediction requires a series of microfluidic fuel cell prototypes with microchannels of different heights. Instead of fabricating several prototypes, a simpler approach is to fabricate a single prototype where the height of the microchannel descends from inlet to outlet. Although a single prototype with a microchannel of this design simplifies the collection of experimental data, the diffusion-limited current at the electrode cannot be predicted by the Levich equation as this equation was derived for an electrode within a microchannel of uniform height.

To address the limits of the Levich equation, a new analytical solution to the convective-diffusion equation was derived that can be used to predict the current density generated at an electrode located on the floor of a microchannel whose height decreases in the direction of flow. The analytical solution was validated with experimental data generated by microfluidic fuel cells with microchannels that have different height gradients. The power of this analytical solution is in its ability to predict the optimal design of a microchannel in a microfluidic fuel cell prior to device fabrication.

Figure 1B:
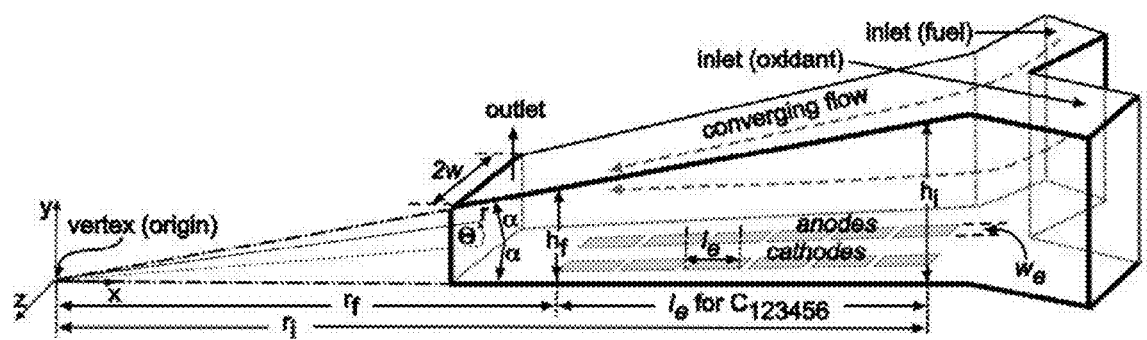

FIG. 1B illustrates the dimensions of the microfluidic fuel cell used in this example. In FIG. 1B, six pairs of gold electrodes of length $l_e$ and width $w_e$ are located on the floor of the microchannel. The sloped ceiling of the microchannel causes fluid to converge as it flows from the inlets to the outlet. Both fuel and oxidant flow along the x-axis, electroactive species diffuse toward the electrodes along the y-axis, and the width of the microchannel is measured along the z-axis. The height of the microchannel decreases from $h_i$ to $h_f$, where $h_i$ and $h_f$ are the heights of the microchannel at the leading edge of the first pair of electrodes and the trailing edge of the last pair of electrodes, respectively. The width of the microchannel is 2W and the distance from the inlet to the first pair of electrodes is L. Laminar or Poiseuille flow along the x-axis is established when L is greater than the entrance length, $L_{ent}$, which is ~0.05 Re $h_i$. The Reynolds number (Re) is equal to Uh/v, where U is the mean velocity of the flow, h is the height of the microchannel, and v is the kinematic viscosity of the solution.

Velocity Profile of Fluid Flow

Flow through a microchannel with a descending height ceiling can be described in cylindrical coordinates (r, θ, z). As shown in FIG. 1B, r is measured from where the ceiling and floor of the microchannel intersect (i.e., vertex) to the electrode of interest. The angle between the ceiling and floor of the microchannel is |2α| with the ceiling and the floor at θ=+α, respectively. An electrode of length $l_e$ is located on the floor of the microchannel between $r_i$ and $r_f$. The height of the microchannel ($h_i$ or $h_f$) is measured at $r_i$ or $r_f$, respectively. The continuity equation for the flow of an incompressible fluid (i.e., density is constant in time and space) through the microchannel is given as:

$$\nabla \cdot v = \text{div} v = 0 \quad [2]$$

where v is the velocity vector. In cylindrical coordinates, v is defined by ($v_r$, $v_\theta$, $v_z$). Two assumptions were made with regard to the continuity equation: there is no variation in the z-direction and therefore $v_z$=0, and fluid flows radially to and from the vertex, along lines of constant θ so that $v_\theta$=0. As a result, Equation 2 rewritten in cylindrical coordinates is:

$$\frac{1}{r}\left[\frac{\partial}{\partial r}(v_r r) + \frac{\partial}{\partial z}(v_z r) + \frac{\partial}{\partial \theta}(v_\theta)\right] = \frac{1}{r}\frac{\partial}{\partial r}(v_r r) = 0 \quad [3]$$

Note that for Equation 3 to be true, $v_r$r must be independent of r. We also assume that $v_r$ is independent of z, so that Equation 2 integrates such that r $v_r$ is a function only if θ=f(θ) or $$v_r = \frac{f(\theta)}{r} \quad [4]$$

According to Equation 4, $v_r$ approaches infinity as r approaches 0. This trend is not relevant to this study, however, because the electrode is not located near the vertex. In addition to the continuity equation, the momentum or Navier-Stokes equation (where Re~3 in this study) is required to complete the description of flow at each point (i.e., to solve the velocity profile of the flow). Applying the same conditions used in the continuity equation (i.e., $v_z = v_\theta = 0$) and $\partial/\partial t = \partial/\partial z = 0$, the r and $\theta$ components of the Navier-Stokes equations become:

$$\rho v_r \frac{\partial v_r}{\partial r} = -\frac{\partial P}{\partial r} + \mu \left[ \frac{\partial}{\partial r} \frac{1}{r} \frac{\partial}{\partial r}(rv_r) + \frac{1}{r^2} \frac{\partial^2 v_r}{\partial \theta^2} \right] \quad [5a]$$

$$0 = -\frac{1}{r} \frac{\partial P}{\partial \theta} + \mu \frac{2}{r^2} \frac{\partial v_r}{\partial \theta} \quad [5b]$$

where rho (kg cm$^{-3}$) is density, P(N cm$^{-2}$) is pressure, and mu (g cm$^{-1}$ s$^{-1}$) is dynamic viscosity of the fluid. Applying no-slip boundary conditions ($v_r = 0$) to the ceiling and the floor of the microchannel at $\theta = +\alpha$ and $-\alpha$, respectively, $$f(+\alpha) = f(-\alpha) = 0 \quad [6]$$

Applying a small angle approximation ($\alpha$ approaches 0) used in the analysis of lubrication problems, allows $f(\theta)$ to be evaluated by solving Equations 5a and 5b to give:

$$f(\theta) = \frac{3Q}{4W\alpha} \left(1 - \frac{\theta^2}{\alpha^2}\right) \quad [7]$$

where Q (cm$^3$ s$^{-1}$) is volumetric flow rate and W (cm) is the width of the microchannel. Substituting equation [7] into equation [4] gives $$v_r = \frac{f(\theta)}{r} = \frac{3q}{4(r\alpha)} \left(1 - \frac{\theta^2}{\alpha^2}\right) \quad [8]$$

where q (cm$^2$ s$^{-1}$) is defined as the volumetric flow rate per unit width (q=Q/W). Equation 8 represents the velocity profile of fluid flow in a microchannel with a descending height. Note that the value of $f(\theta)$ is negative when flow converges toward the vertex and thus, negative q represents inflow.

Solution to the Convective-Diffusion Equation

Changes in concentration are confined to the volume close to the surface of the electrode when convection is more efficient than diffusion (i.e., at high Peclet number). Under these conditions, the parabolic velocity profile in the microchannel given by equation [8] can be replaced with a linear velocity profile near the surface of the electrode. Consequently, equation [8] becomes $$v_r = \frac{3q}{4(r\alpha)} \left(1 - \frac{\theta^2}{\alpha^2}\right) = \frac{3q}{4(r\alpha)} \frac{(\theta + \alpha)(\theta - \alpha)}{\alpha^2} \approx \frac{3q}{2(r\alpha)} \left(1 - \frac{|\theta|}{\alpha}\right) \quad [9]$$

and is valid for $\theta \approx \pm \alpha$, which corresponds to the vicinity of the ceiling and the floor of the microchannel. For this example, the electrode is located on the floor of the microchannel and therefore, $\theta \approx -\alpha$ is considered. The practice of approximating a parabolic velocity profile with a linear velocity profile originates from theory introduced by Lévêque regarding heat transfer in pipes, and thus, will be referred to as the Lévêque approximation henceforth.

The general convective-diffusion equation is given by:

$$\frac{\partial C}{\partial t} = D\nabla^2 C - v \cdot \nabla C \quad [10]$$

where C (mol cm$^3$) is concentration and D (cm$^2$ s$^{-1}$) is the diffusion coefficient. Rewriting Equation 10 in cylindrical coordinates gives:

$$\frac{\partial C}{\partial t} = \frac{D}{r} \left[ \frac{\partial}{\partial r}\left(r\frac{\partial C}{\partial r}\right) + \frac{\partial}{\partial z}\left(r\frac{\partial C}{\partial z}\right) + \frac{\partial}{\partial \theta}\left(\frac{1}{r}\frac{\partial C}{\partial \theta}\right) \right] - v_r \frac{\partial C}{\partial r} - v_z \frac{\partial C}{\partial z} - \frac{v_\theta}{r} \frac{\partial C}{\partial \theta} \quad [11]$$

Assuming diffusion both parallel (r-direction) and perpendicular (z-direction where we<<w) to the direction of convective flow are negligible and $v_\theta = v_z = 0$, Equation 11 (under the Lévêque approximation) becomes:

$$\frac{\partial C}{\partial t} = \frac{D}{r^2}\left(\frac{\partial^2 C}{\partial \theta^2}\right) - \frac{3q}{(2r\alpha)}\left(1 - \frac{|\theta|}{\alpha}\right)\frac{\partial C}{\partial r} \quad [12]$$

which is, at steady state:

$$D\left(\frac{\partial^2 C}{\partial \beta^2}\right) - \frac{3_q}{2\alpha^2} \beta r \frac{\partial C}{\partial r} \quad [13]$$

where $\beta = \alpha - |\theta|$. Substituting y=ln r, the convective-diffusion equation takes the form $$D\frac{\partial^2 C}{\partial \beta^2} = \frac{3_q}{2\alpha^2} \beta \frac{\partial C}{\partial y} \quad [14]$$

Only the maximum diffusional flux will be determined, for which the boundary conditions are C approaches $C_o$ as $\beta$ approaches infinity, and C=0 at $\beta$=0, where $C_o$ (mol/cm$^3$) is defined as the bulk concentration. Equation 14 is colved by introducing the dimensionless quantity:

$$\eta = \left(\frac{3q}{2D\alpha^2 y}\right)^{1/3} \beta \quad [15]$$

and leads to the second-order ordinary differential equation:

$$\frac{\partial^2 C}{\partial \eta^2} + \frac{1}{3}\eta^2 \frac{\partial C}{\partial \eta} = 0 \quad [16]$$

Thus, the maximum diffusional flux (Jmax) toward the electrode in the microchannel is given by $$J_{max} = \frac{D}{r}\frac{\partial C}{\partial q}\bigg|_{q=-a} = \frac{D}{r}\frac{\partial C}{\partial b}\bigg|_{q=0} = \frac{D}{r}\left(\frac{3q}{2D\alpha^2 y}\right)^{1/3}\frac{\partial C}{\partial h}\bigg|_{h=0} \quad [17]$$

$$= \frac{D}{r}\left(\frac{3q}{2D\alpha^2 \ln r}\right)^{1/3}\frac{C_o}{9^{1/3}(0.89)}$$

The maximum diffusional flux also is defined as $$J_{max} = \frac{DC_o}{\delta} \quad [18]$$

where δ (cm) is the thickness of the diffusion layer. Assuming that the electrochemical reaction only takes place at the surface of the electrode, then δ=0 at r≥$r_i$ (recall r is measured from the vertex). Using this condition and equating Equation 17 with Equation 18 gives:

$$\delta = 9^{1/3}(0.89)r\left(\frac{2DW\alpha^2 \left|\ln\frac{r}{r_i}\right|}{3Q}\right)^{1/3} \quad [19]$$

Substituting Equation 18 into Equation 19 and integrating gives an expression for the diffusion-limited current ($I_{LIM}$) at the electrode:

$$I_{LIM} = nFw_e \int_{r_f}^{r_i} J_{max}\,dr \quad [20]$$

$$= nFw_e \left(\frac{3D^2 Q}{2\alpha^2 w}\right)^{1/3}\frac{C_o}{9^{1/3}(0.89)}\int_{r_f}^{r_i}\frac{1}{r\left|\left(\ln\frac{r}{r_i}\right)^{1/3}\right|}\,dr$$

$$= nFw_e \left(\frac{3D^2 q}{2\alpha^2}\right)^{1/3}\frac{C_o}{9^{1/3}(0.89)}\int_{u_f}^{u_i} u^{-1/3}\,du$$

where u=ln r/$r_i$, n is the number of electrons, F is the Faraday constant, and $w_e$ is the width of the electrode. Solving Equation 20 gives:

$$I_{LIM} = nFw_e\left(\frac{3D^2 q}{2\alpha^2}\right)^{1/3}\frac{C_o}{9^{1/3}(0.89)}\frac{3}{2}\left([u]_{u_f}^{u_i}\right)^{2/3} \quad [21]$$

$$= 0.928 nFw_e C_o \left(\frac{D^2 Q}{W\alpha^2}\right)^{1/3}\left(\ln\frac{r_i}{r_f}\right)^{2/3}$$

$$= 0.928 nFw_e C_o \left(\frac{D^2 Q}{W\alpha^2}\right)^{1/3}\left(\ln\frac{h_i}{h_f}\right)^{2/3}$$

Note that when a approaches 0 and $h_i/h_f$ approaches 1, $I_{LIM}$ approaches the Levich Equation (Equation 1).

Example 2

In this example, the experimental results obtained using fuel cells with microchannels with various cross-sectional profiles are outlined.

Microfluidic Fuel Cells with Microchannels of Uniform or Descending Height

Figure 2:
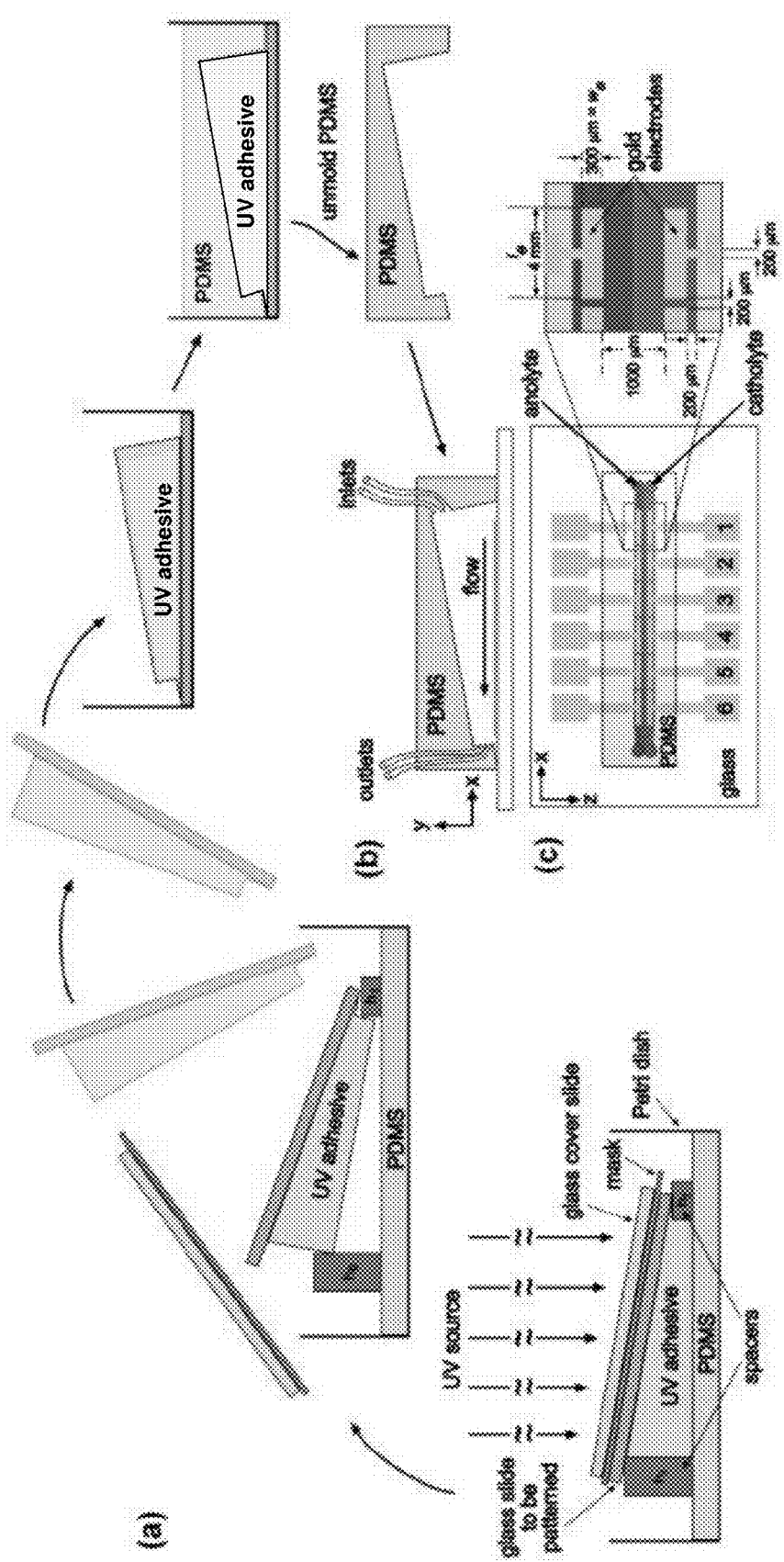
FIGS. 2A-2C are schematic illustrations outlining of one set of embodiments outlining the fabrication process of the microfluidic devices.

FIGS. 2A-2C illustrate the steps used to fabricate microchannels and assemble the fuel cell used in this example. FIG. 2A outlines the fabrication of a mold from cured UV-adhesive that will produce a microchannel with a sloped ceiling. FIG. 2B illustrates the assembly of a microfluidic fuel cell with a sloped microchannel FIG. 2C includes a plan view of the device with a section of the microchannel enlarged to reveal the dimensions around each pair of electrodes.

Three microchannels were fabricated for testing in a microfluidic fuel cell: (1) $h_i$=250 microns, $h_f$=250 microns, $h_i/h_f$=1, uniform height; (2) $h_i$=240 microns, $h_f$=110 microns, $h_i/h_f$=2.183, shallow gradient; and (3) $h_i$=420 microns, $h_f$=110 microns, $h_i/h_f$=3.81, steep gradient. In all cases, the microchannel was 2 mm wide. Six pairs of electrodes were fabricated within each microchannel with subsequent pairs separated by 200 microns. Each electrode in a pair was 300 microns wide and 4 mm long, and the electrodes in each pair were separated by 1000 microns.

Electrode Configurations

The performance of each microfluidic fuel cell was tested using six different electrode configurations, each outlined in Table 1. To ensure that the anodic reaction was not rate limiting, the concentration of $K_4Fe(CN)_6$ in the anolyte was 1.5 times that of $K_3Fe(CN)_6$ in the catholyte (50 mM), and the anode consisted of all six electrodes spanning the length of one side of the microchannel

TABLE 1

Location of anodes and cathodes in the six configurations tested.

| Legend used in Figures | Location of Anode* | Location of Cathode* |
|---|---|---|
| C1 | 1, 2, 3, 4, 5, 6 | 1 |
| C12 | 1, 2, 3, 4, 5, 6 | 1, 2 |
| C123 | 1, 2, 3, 4, 5, 6 | 1, 2, 3 |
| C1234 | 1, 2, 3, 4, 5, 6 | 1, 2, 3, 4 |
| C12345 | 1, 2, 3, 4, 5, 6 | 1, 2, 3, 4, 5 |
| C123456 | 1, 2, 3, 4, 5, 6 | 1, 2, 3, 4, 5, 6 |

*Electrodes in the microchannel are numbered 1 through 6 as shown in FIG. 2C.

Performance of a Microfluidic Fuel Cell with a Microchannel of Uniform Height

Applying the Lévêque approximation (i.e., replacing the parabolic velocity profile of flow in the microchannel with a linear velocity profile near the surface of the electrode), Levich calculated the diffusion limited current ($I_{max}$) for an electrode of length $l_e$ in a microchannel of uniform height to be $$I_{max} = 1.468 nFw_e C_o \left(\frac{QD^2 l_e^2}{Wh^2}\right)^{1/3} \quad [22]$$

with the corresponding diffusion layer (δ) expressed as $$\delta = 1.035\left(\frac{DWl_e h^2}{Q}\right)^{1/3} \quad [23]$$

Figure 3A:
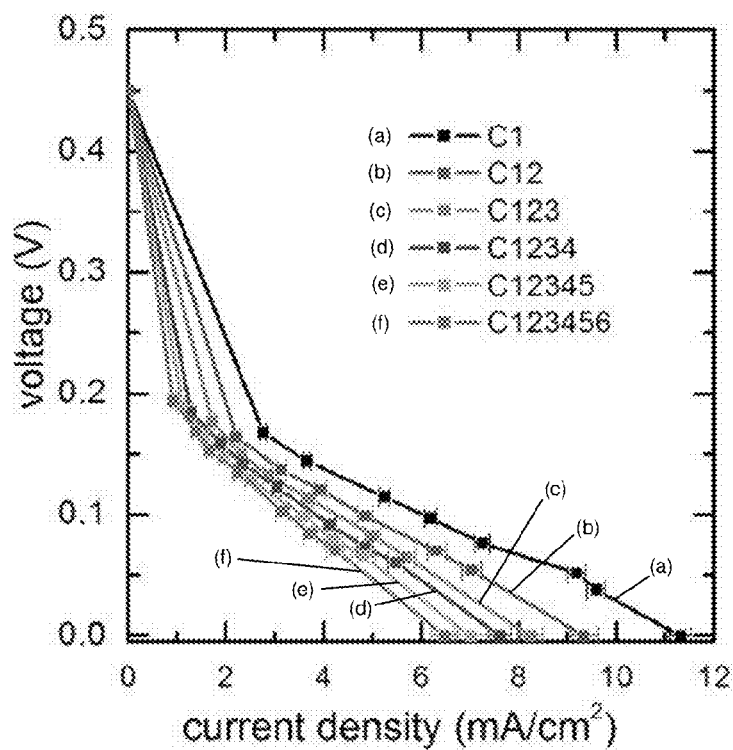
FIGS. 3A-3B are plots of (A) voltage as a function of current density and (B) power density as a function of voltage, according to one set of embodiments.
Figure 3B:
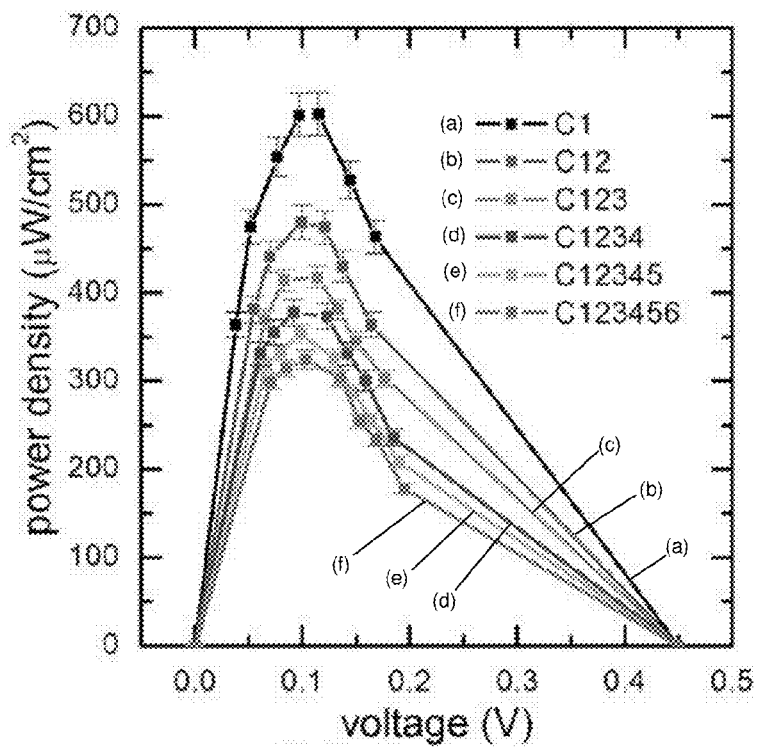

Shown in FIG. 3 are experimental data generated by a microfluidic fuel cell with a microchannel of uniform height (h=$h_i$=$h_f$=250 microns) operated using the electrode configurations listed in Table 1. A flow rate of 200 μl/min was used in these experiments. In FIG. 3A, the current density was obtained by dividing the measured current by the total geometric area of the cathodic electrodes. For FIG. 3B, the power density was obtained similarly.

The measured potentials of the anolyte and catholyte were 50 mV and 500 mV vs. SCE, respectively, prior to injection into the microfluidic fuel cell. The open circuit voltage (OCV) of the device measured between 440 and 450 mV for the six configurations. Both diffusion-limited current density and power density decreased as the length of the electrode increased because the thickness of the diffusion layer increased proportionally to $(l_e)^{1/3}$.

Two ratios were defined to compare the performance of a microfluidic fuel cell operated using each of the six different electrode configurations: (i) the diffusion-limited current density for a particular configuration relative to that of the C1 configuration:

$$I_n = \frac{(i/cm^2 c_n)}{(i/cm^2 c_1)} \quad [24]$$

and (ii) the maximum power density for a particular configuration relative to that of the C1 configuration $$W_n = \frac{(W/cm^2 c_n)}{(W/cm^2 c_1)} \quad [25]$$

Data for these ratios were taken from the polarization curves shown in FIG. 3.

Figure 4:
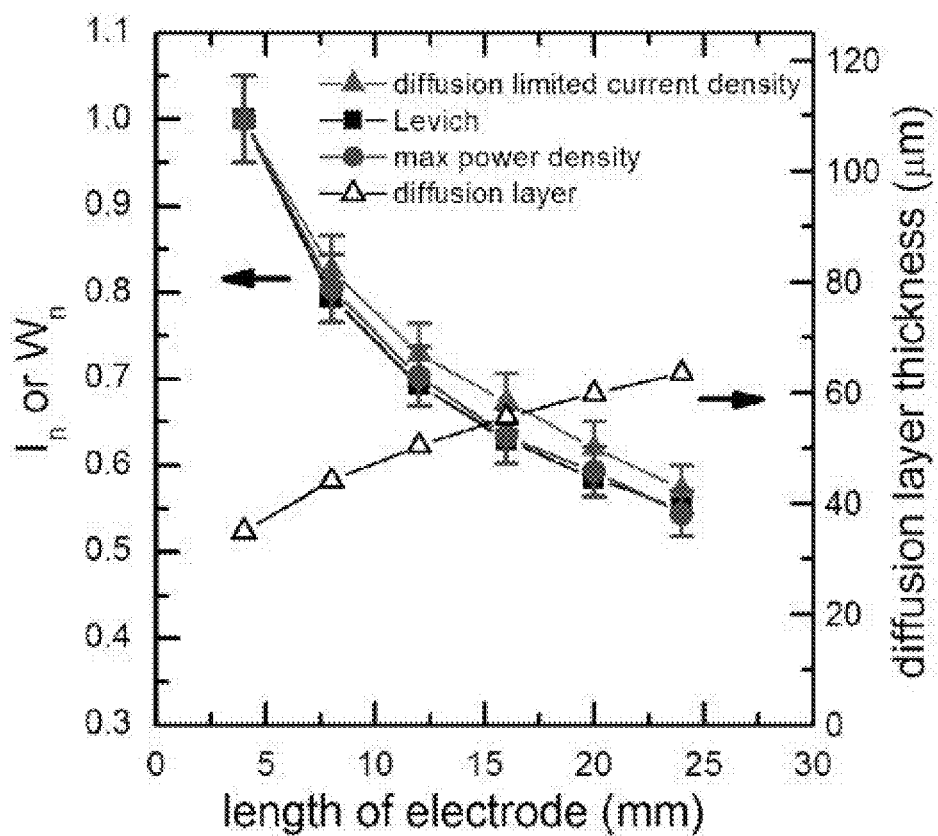
FIG. 4 is a plot of the normalized power and current densities as a function of electrode length and diffusion layer thickness, according to one set of embodiments.

FIG. 4 shows the resulting values plotted as a function of electrode length for each particular configuration (e.g., for C12, the electrode length equals 2×4 mm). $I_n$ and $W_n$ were derived from data in FIG. 3 and substituted into Equations 24 and 25. In FIG. 4, the right y-axis corresponds to thickness of the diffusion layer measured at the trailing edge of the cathode. As the length of the electrode increased, $I_n$ and $W_n$ decreased. Moreover, $I_n$ agreed well with the analytical solution to the Levich equation.

Agreement between $I_n$ and the analytical solution to the Levich equation confirmed that the experimental conditions matched the three assumptions employed to solve the Levich equation. The first assumption was that diffusional transport of electroactive species does not affect current density or power density. This assumption was based on the large Peclet number (Pe=6250) calculated for this experiment. Recall that Pe describes the relationship between convection and diffusion of electroactive species. When Pe>1000, the concentration distribution is dominated by convection and therefore, diffusion can be neglected. At high Pe, the flow is nominally divided into two regions: (i) one of constant concentration far from the surface of the electrode, and (ii) one of rapidly changing concentration in the immediate vicinity of the surface of the electrode (i.e., the diffusion layer). The diffusion layer does not have a clearly defined boundary but is simply the region where the concentration gradient is at its maximum. The second assumption was that flow in the microchannel is laminar based on the calculated value of the Reynolds number (Re~3). Laminar flow is maintained when Re<2500. Finally, the third assumption was that Poiseuile flow was fully developed in the microchannel prior to reaching the leading edge of the reactive surface. The validity of this assumption was assured by locating the first pair of electrodes 3 mm from the Y-junction, which was well beyond the entrance length ($l_{ent}$) of 37.5 microns.

The thickness of the diffusion layer, as calculated by Equation 23, increased as the length of the cathode increased. The diffusion layer at the downstream edge of the C1 configuration was 1.8 times thinner than that of the C123456 configuration. This difference meant that the concentration gradient was steepest for the C1 configuration, which resulted in a higher current density compared to the C123456 configuration. At the trailing edge of the cathodic electrode of the C123456 configuration, the thickness of the diffusion layer increased to about 60 microns. The Lévêque approximation, which replaces a parabolic velocity profile with a linear one near the surface of the electrode, assumes that diffusion of reactant to the electrode originates from only a small distance away from the surface of the electrode. The thick diffusion layer (60 microns) of the C123456 configuration, however, was comparable in size to the height of the microchannel (250 microns) and consequently, the Lévêque approximation did not hold. The convective-diffusion equation (Equation 9) may be solved using a parabolic velocity profile for flow instead of a linear velocity profile without taking into account the length scale of the diffusion layer. A comparison of this solution and the Levich solution to the convective-diffusion equation shows that if 2wDl/Qh<<1 (i.e., 0.0033 to 0.019) for the C1 to C123456 configurations, the Levich analysis is still valid, which explains the good correlation between the analytical solution and the experimental data (FIG. 4) for electrodes ranging in length from 4 mm (C1) to 24 mm (C123456).

The consistency of the OCVs (FIG. 3A) and good correlation between the analytical and experimental results (FIG. 4) demonstrated that the 1000-micron gap between the cathode and the anode prevented diffusional crossover at the anolyte-catholyte interface from affecting the performance of the device and therefore, could be ignored in subsequent experiments. Moreover, the good correlation between the analytical results and experimental data verified the assumption that individual cathodes, 4 mm in length and with a 200 micron gap between subsequent cathodes (e.g., in the C12 to C123456 configurations), could be treated as a single, continuous cathode.

Figure 5A:
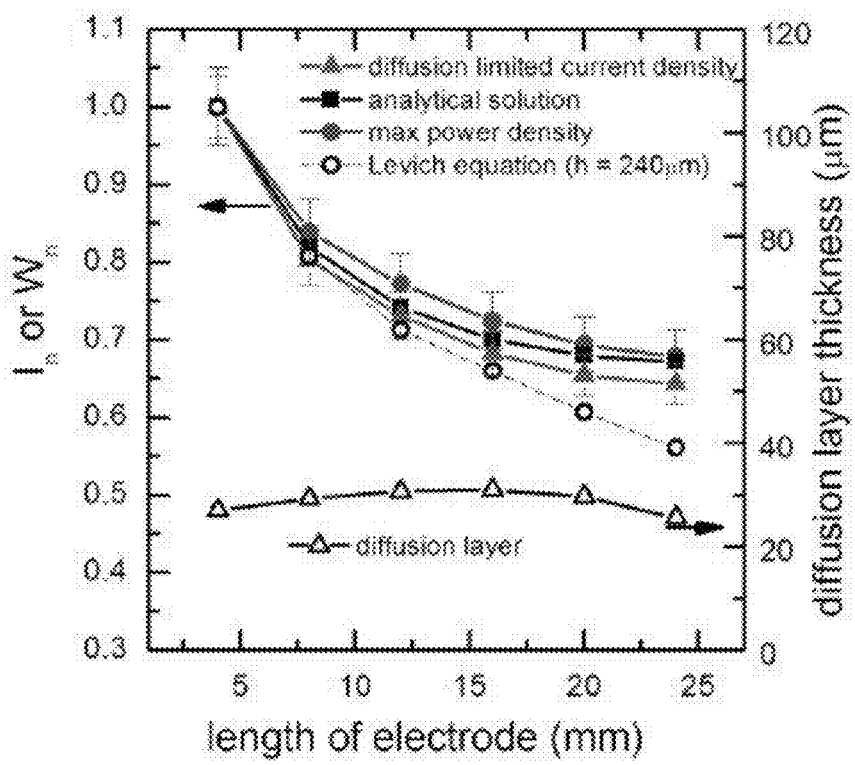
FIGS. 5A-5B are plots of the normalized power and current densities as a function of electrode length and diffusion layer thickness, according to one set of embodiments.

Performance of a Microfluidic Fuel Cell with a Microchannel of Descending Height The next experiment tested the analytical solution of the convective diffusion equation against data generated by a microfluidic fuel cell with a microchannel that descended in height (e.g., $h_i/h_f$=2.18 where $h_i$=240 microns and $h_f$=110 microns). As shown in FIG. 5A, $I_n$ and $W_n$ decreased as the length of the electrode increased for a device with a height gradient of 2.18. As discussed in the first experiment, the electrode was non-uniformly accessible. Based on Equation 22 for the thickness of the diffusion layer, a reduction in the height of the microchannel in the direction of flow effectively reduces the thickness of the diffusion layer adjacent to the surface of the electrode. Consequently, the mass flux to the electrode increases, which results in higher current densities. Thus, $I_n$ and $W_n$ are higher when generated by a device with a microchannel of descending height ($h_i/h_f$=2.18) than when generated by a device with a microchannel of uniform height ($h_i/h_f$=1) (cf., FIG. 4) despite the fact that the performance of both devices decreases as the length of the electrode increases.

Although Equation 22 predicts that the thickness of the diffusion layer is a function of microchannel height, this equation cannot used to quantify the profile of the diffusion layer adjacent to an electrode in a microchannel with a descending height. Consequently, Equation 22 cannot be used to predict the diffusion-limited current density generated by such a device. In contrast, the analytical solution in Equation 21 accurately models the diffusion-limited current density generated by this device ($h_i/h_f=2.18$) as revealed by the good agreement between theory and experimental data shown in FIG. 5A.

Figure 5B:
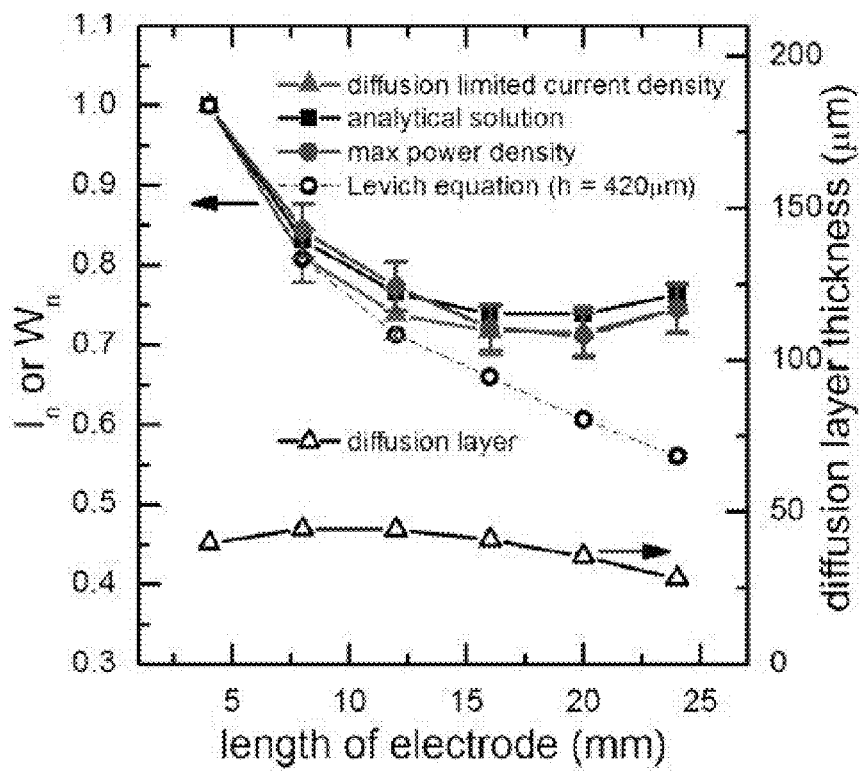

The diffusion-limited current density (and maximum power density) did not increase, however, when the height ratio of the microchannel was 2.18 despite a reduction in the thickness of diffusion layer when $l_e>1.6$ cm (cf., C1234 configuration, FIG. 5A). To observe an increase in current density with increase in electrode length, a steeper height gradient was needed. Equation 21 predicts that the diffusion-limited current density will increase in a device with a height ratio of 4 when $l_e>1.6$ cm. FIG. 5B includes experimental data that confirmed this prediction using a device with a height ratio of 3.8. The diffusion layer profile (right-axis data, FIG. 5B) exhibited a steeper decline compared to that in the previous experiment (FIG. 5A), resulting in an increase in performance in the device with a height ratio of 3.8.

Microchannels of Uniform Vs. Descending Heights

The previous three experiments demonstrated that a microchannel with a descending height may overcome the decrease in performance caused by a thickening diffusion layer. To determine which device performed the best, we compared their efficiency at fuel utilization. This comparison required both devices to have the same amount of fuel in the microchannel (i.e., equivalent area in a longitudinal section when the length of the microchannel was the same for both devices) and can be made analytically (i.e., comparing the results from Equation 22, where $h_i=h_f$, to those from Equation 21, where $h_i \neq h_f$) based on the following arguments. First, based on our experiments, the device that generated the highest diffusion-limited current density always produced the highest power density. This observation was a consequence of the diffusion layer profile, adjacent to the surface of the electrode, being similar regardless of whether the device was operated at high or low loads. Second, the analytical solution of the diffusion-limited current density correlated well with experimental data.

By fixing the length ($l_e=2.5$ cm for C123456) and width ($w=1$ mm) of the microchannels, devices with equivalent areas in their longitudinal sections could be compared in terms of performance (Table 2). For example, the area of the longitudinal section ($h_i+h_f=2h$) through a microchannel with a uniform height of 250 microns is equivalent to that of a microchannel with a 3:1 height gradient from $h_i=375$ microns and $h_f=125$ microns. A comparison of these two microchannels revealed that a device with a microchannel that descends in height performed better (~3%) than one with a microchannel of uniform height, and that increasing the steepness in the height gradient resulted in a further improvement in performance (e.g., ~19% for a 7:1 height gradient). It should be noted that the ratio of maximum power density of two devices (W*) is approximately equal to the ratio of their maximum current density (I*).

The increase in performance delivered by a microfluidic fuel cell with a descending height required an increase in pumping power. Both acceleration and friction contributed to a drop in pressure down the length of the microchannel. Acceleration, however, did not contribute to a pressure drop in a microchannel of uniform height because the velocity of flow was constant. In contrast, the velocity of flow increased along the length of a microchannel with a descending height. Consequently, acceleration of flow contributed to a drop in pressure along the length of the microchannel. As a result, pumping power for a microchannel increased as the steepness of the height gradient increased when the microchannels were equivalent in the area of a longitudinal section (Table 2). Pumping power for a microchannel with a uniform height is defined as:

$$P_{uniform} = \frac{12Q^2 \mu L}{wh^3} \quad [26]$$

and for one with a height gradient from $h_i$ to $h_f$ is defined as $$P_{descending} = \frac{3Q^2 \mu w}{\alpha}\left(\frac{1}{h_f^2} - \frac{1}{h_i^2}\right) \quad [27]$$

TABLE 2

Performance of microfluidic fuel cells with different microchannels and the corresponding pumping power required.

| $h_i$ (microns) | $h_f$ (microns) | $h_i/h_f=s$ | $h_i+h_f=2h$ (microns) | $I^* = I_s/I_h$ | $P^* = P_d/P_u$ |
|---|---|---|---|---|---|
| 333 | 167 | 2 | 500 | 1.03 | 1.27 |
| 375 | 125 | 3 | 500 | 1.06 | 1.78 |
| 400 | 100 | 4 | 500 | 1.10 | 2.44 |
| 417 | 83 | 5 | 500 | 1.13 | 3.24 |
| 429 | 71 | 6 | 500 | 1.16 | 4.17 |
| 437.5 | 62.5 | 7 | 500 | 1.19 | 5.22 |

Using a 50 mM solution of $Fe(CN)_6^{3-}$, the maximum power output of a device with a microchannel of uniform height (e.g., 250 microns) operated in the C123456 configuration was calculated to be 23.3 micro-Watts (i.e., 324 $\mu W/cm^2 \times 0.4$ cm ($l_e$)$\times 0.03$ cm ($w_e$)$\times 6$) based on data shown in FIG. 3B and Table 2. Assuming a pumping efficiency of 50% and taking into account that two separate syringes deliver fuel and oxidant to the microchannel, Equation 26 predicted that 0.82 micro-Watts was required for pumping. In comparison, when the device includes a microchannel with a height gradient of $h_i/h_f=4$, the gain in power over the device with a microchannel of uniform height is 23.3 $\mu W \times (1.1-1)=2.3$ micro-Watts whereas the increase in pumping power is only 0.82 $\mu W \times (2.44-1)=1.18$ micro-Watts. Consequently, the gain in power output is sufficient to offset the increase in pumping power needed to drive fuel and oxidant through a microchannel with a height gradient.

Figure 6:
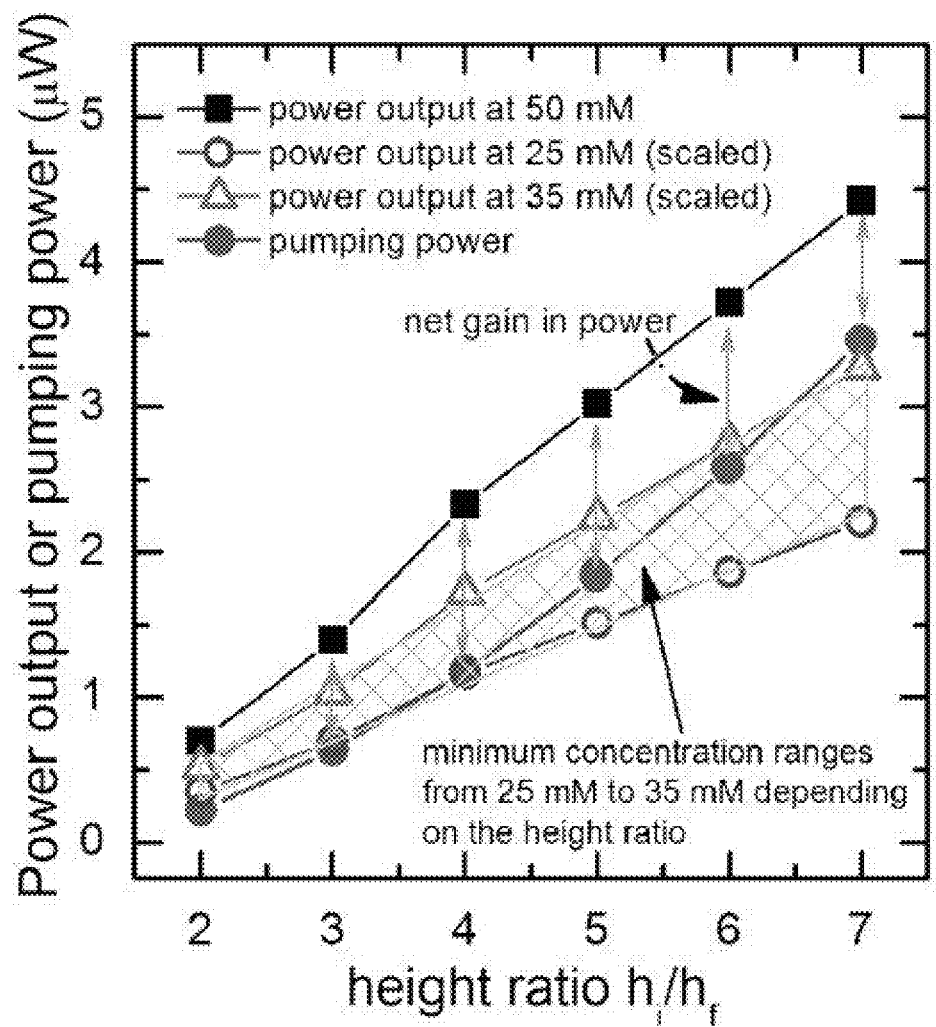
FIG. 6 includes plots of the power output or pumping power as a function of height ratio, according to one set of embodiments.

This offset is illustrated in FIG. 6 for microchannels with height gradients that range from 2:1 to 7:1. FIG. 6 includes a plot of power (generated and consumed) as a function of the height ratio of the microchannel to illustrate the effect of concentration on net power output (indicated by double arrow at each height ratio). For a microfluidic fuel cell, pumping power is independent of concentration of fuel/oxidant whereas power output is not. As such, increasing the concentration of fuel/oxidant increases the net power output of a microfluidic fuel cell with a sloped microchannel. Depending on the height gradient of the microchannel, there will be a minimum concentration of fuel required to offset the increase in pumping power. For example, using 50 mM of $Fe(CN)_6^{3-}$ in a microchannel with a height ratio of 7:1, the increase in power output over a device with a microchannel of uniform height is 4.5 $\mu W$ and the corresponding increase in pumping power is 3.2 $\mu W$. Assuming power output varies linearly with concentration, the minimum concentration of $Fe(CN)_6$ needed to offset the increase in pumping power required for this height ratio is (50 mM/4.5 $\mu W) \times (3.2$ $\mu W)=35$ mM $Fe(CN)_6^{3-}$. Similar arguments apply to microchannels with a lower height ratio, where only 25 mM $Fe(CN)_6^{3-}$ is required for balance of plant. The hatched region in FIG. 6 represents the minimum concentration of $Fe(CN)_6^{3-}$ (25 mM to 35 mM) that will offset the increase in pumping power required for microchannels with height ratios that range from 2:1 to 7:1. Note that the power output data for 25 and 35 mM $Fe(CN)_6^{3-}$ shown in FIG. 6 were determined by scaling the 50 mM data by 2 and 1.43 respectively, which correspond to the increase in power output observed at each height ratio for 50 mM of $Fe(CN)_6^{3-}$.

Previous studies have shown that using a concentration of electroactive species in the molar range will generate power densities in the mW/cm² range. Therefore, the concentration of the reactants can be increased to the point of saturation to maximize the net gain in power. In addition to increasing the concentration of reactants, the width of the electrode can be increased to increase the power density, to further offset the increase in pumping power. Care must be taken, however, to ensure that increasing the width of the electrode does not occur at the expense of fuel crossover. Another approach to increasing the power density of the fuel cell is to increase the cell voltage by selecting a fuel and oxidant with a large difference in their formal potentials. Finally, the pressure drop due to accelerated flow within a microchannel with a descending height offers one advantage; it can be used to increase the number of electrocatalytic sites by dislodging accumulated bubbles of gas (e.g., $CO_2$ produced from the oxidation of methanol), thus potentially increasing the performance of the fuel cell.

Experimental Procedure

Chemicals:

$K_4Fe(CN)_6$/$K_3Fe(CN)_6$ were purchased from Sigma-Aldrich; PDMS (poly(dimethylsiloxane), Sylgard 184) was purchased from Dow Corning; a thiolene-based optical adhesive (adhesive #81) was purchased from Norland Products; and both positive photoresist and developer (S1813 and MF312, respectively) were purchased from Shipley.

Fabrication of Microelectrodes and Microchannels:

Soft-lithography and metal lift-off protocols were used to fabricate microelectrodes. Microchannels of uniform height were fabricated using standard photolithography. Fabricating a microchannel with a descending height required an alternative method. Briefly, two polycarbonate spacers were placed on a PDMS working surface to define the ends of the microchannel mold. Optical adhesive (5 mL) was poured slowly onto this working surface taking care not to introduce air bubbles. A glass slide (75×50×1 mm) was lowered at a shallow angle and placed on top of the two spacers. Subsequently, a mask was placed on top of the glass slide followed by a second glass slide to weight the mask. A UV-lamp (Blak-Ray, model B-100SP, 160 Watts) was positioned 1 m above the mask. The optical adhesive was exposed to 4-4.5 min of irradiation, depending on the desired height gradient. After removal of the mask, the glass slide with cured optical adhesive was inverted and sprayed with ethanol to remove uncured adhesive. Uncured adhesive should not be removed by immersion in solvent because of contamination issues. Acetone could be used sparingly to remove uncured adhesive not removed by ethanol. Once cleaned, the patterned glass slide was irradiated an additional 10 min to increase the mechanical stability of the sample prior to a final bake at 50° C. for 12 hr.

Fabrication of the Microfluidic Fuel Cell:

Monomers of PDMS were poured onto the patterned surface of UV-adhesive, cured, and released from the substrate to produce a PDMS slab (~1 cm thick) containing a trench that defined three sides of a microchannel Both the PDMS slab and the glass slide with microelectrodes were plasma etched (Harrick PDC-32G) prior to pressing their surfaces together. Markers were included in the microelectrode pattern to facilitate alignment of the microelectrodes with the trench in the PDMS slab.

Anolyte and Catholyte:

The anolyte consisted of 75 mM of $Fe(CN)_6^{4-}$ in 0.1 M HCl. The measured potential of the anolyte was 50 mV vs. SCE. The catholyte consisted of 50 mM of $Fe(CN)_6^{3-}$ in 0.1 M HCl. The measured potential of the catholyte was 500 mV vs. SCE. The diffusion coefficient (D) of $Fe(CN)_6^{3-}$/$Fe(CN)_6^{4-}$ was determined from the peak current ($i_p$) in the cyclic voltammogram measured in 0.1 M HCl and found to be $5\times10^{-6}$ cm²/s.

Pumping:

A syringe pump (Harvard Apparatus Syringe infusion pump 22) delivered anolyte and catholyte into the microchannel at a flow rate (Q) of 200 microliters/min (0.0033 cm³/s) via polyethylene tubing (PE20, Becton Dickinson). The Reynolds number (Re), entrance length ($l_{ent}$) and Peclet number (Pe) were calculated as follows:

$$Re = Uh/v = Uh_i/v = Uh_f/v = Q/(wv) = 0.0025/(0.01\times0.1) = 2.5;$$

$$l_{ent} = 0.05 h_i Re = 0.025 \text{ to } 0.05 \text{ mm for } h_i = 0.2 \text{ to } 0.4 \text{ mm; and}$$

$$Pe = Uh/D = 6250.$$

Measurement of Performance of Microfluidic Fuel Cell:

Polarization curves were obtained by connecting external resistors (1 MΩ to 0Ω) in series between the anode and cathode and by measuring the resulting potential and current with an Agilent 39470A Data Acquisition Unit. Each polarization data point represents the average value taken over a period of 20 seconds. Subsequent measurements were performed only after the original open-circuit potential was established to insure the concentration of fuel and oxidant at the surface of the electrodes had returned to their bulk values.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   providing an enclosed microchannel wherein the microchannel comprises:
      a first microchannel segment with a first cross-sectional area,
      a second microchannel segment with a second cross-sectional area that is smaller than the first cross-sectional area, and
      a surface comprising a reactive surface portion; and
   flowing a liquid through the microchannel from the first segment to the second segment, wherein the liquid comprises at least one reactant capable of chemically or biologically reacting at the reactive surface portion of the microchannel,
   wherein the distance between the surface comprising the reactive surface portion and an opposing surface is larger at a first point on the surface comprising the reactive surface portion than at a second point on the surface comprising the reactive surface portion directly downstream of the first point, and
   wherein the distance between the surface comprising a reactive surface portion and an opposing surface decreases at a rate of at least about 1:500.

2. A method as in claim 1, wherein the microchannel is part of a fuel cell.

3. A method as in claim 1, wherein the reactive surface portion comprises an electrode.

4. A method as in claim 1, wherein the ratio of the distances between two opposing surfaces measured at a first point on one of the two opposing surfaces and a second point on the same surface and directly downstream of the first point is at least about 1.5:1.

5. A method as in claim 1, wherein the cross-sectional area of the channel decreases by at least about 5% over a length substantially parallel to the average direction of fluid flow of less than about 100 mm.

6. A method as in claim 1, wherein the reactive surface portion comprises a catalyst.

7. A method as in claim 1, wherein a catalyst is immobilized on the reactive surface portion.

8. A method as in claim 1, wherein the reactive surface portion comprises a second reactant.

9. A method as in claim 1, wherein a second reactant is immobilized on the reactive surface portion.

10. A method as in claim 1, wherein a binding partner is immobilized on the reactive surface portion.

11. A method as in claim 1, wherein the at least one reactant comprises a biological molecule capable of binding to a second biological molecule.

12. A method as in claim 1, wherein the reactant comprises a protein.

13. A method as in claim 1, wherein chemically or biologically reacting comprises decomposing a reactant into one or more products.

14. A method as in claim 1, wherein chemically or biologically reacting comprises forming one or more products from a first reactant and a second reactant using a catalyst.

15. A method as in claim 1, wherein the reactant comprises a fuel.

16. A method as in claim 1, wherein the reactant comprises a hydrocarbon.

17. A method as in claim 1, wherein the reactant comprises methanol.

18. A method as in claim 1, wherein the reactant comprises an oxidant.

* * * * *